Patented July 28, 1936

2,048,778

UNITED STATES PATENT OFFICE 2,048,778

AMINE MODIFIED POLYHYDRIC ALCOHOL-POLYBASIC ACID RESINS

Merlin Martin Brubaker, Wilmington, Del., and Raymond Einnon Thomas, Newburgh, N. Y., assignors to E. I. du Pont de Nemours & Company, Wilmington, Del., a corporation of Delaware No Drawing. Application August 31, 1931, Serial No. 560,492

2 Claims. (Cl. 260—8)

This invention relates to resinous compositions, and more particularly it relates to new resins of the polyhydric alcohol-polybasic acid type prepared from an organic amine, a polyhydric alcohol and a polybasic acid, with or without various additional modifying agents. Still more specifically the invention relates to the application of these new resins in various arts.

This invention has as an object the production of new resinous compositions useful for the preparation of improved lacquers, enamels, protective coatings in general, and various other products. A further object resides in processes for making these resins. A still further object is the preparation of enamels suitable for high temperature baking over other priming coats. Other objects will appear hereinafter.

These objects are accomplished by the following invention in which the ingredients for resins of the polyhydric alcohol-polybasic acid type are treated with varying quantities of organic amine type compounds in the manner more fully referred to hereinafter.

We have discovered that the organic amines, particularly the primary and secondary amines, are very useful in conjunction with fatty oil acids as modifying agents for polyhydric alcohol-polybasic acid type resins when the amines are incorporated into the resins in the manner disclosed herein. We have found from experiments with many kinds of amines that this discovery is not limited by the nature or amount of the amine (even though some amines give somewhat better results than others) or by the nature of the polyhydric alcohol and polybasic acid. We have found that the usual modifying agents other than the amine, such as fatty oils, fatty oil acids, natural resins, monovalent alcohols and acids, etc., which have been used heretofore in polyhydric alcohol-polybasic acid resins, can be employed with equal if not greater facility in the presence of an amine, since the amines are very reactive substances. The exact method of combining these new modifying agents with the remaining ingredients, as well as the exact proportions, will, in view of the following disclosure, be apparent in most instances to those skilled in the art, though obviously certain variations in the method are necessary because some amines are liquids and others gases and solids. The latter will be more evident from the procedure and examples given hereinafter.

A satisfactory procedure for carrying out this invention is as follows: the polyhydric alcohol and polybasic acid, along with any additional modifying agents (drying oil acids, natural gums, etc.) are heated together to a temperature of 180–200° C. The amine is then added slowly at the rate of about 100 gm. per hour per kilogram or "resin charge" (exact meaning defined below), the temperature still being kept in the range 180–200° C. A convenient apparatus consists of a vessel provided with a stirrer, temperature measuring or recording device, a short air-cooled reflux condenser, and some suitable arrangement for the addition of the amine. After the addition of the latter substance, the temperature is raised about 25° (to 200–225° C.) and heating continued in this range for 4–10 hours, the exact time and temperature depending upon the type and amount of the amine present. A lower temperature is usually required when larger quantities of amines are used. A longer period of heating can be used where the resin formed using the amine is more resistant to darkening on heating. Heating causes in general an increase in viscosity, a decrease in solubility, and a shorter drying time for lacquers made from the resin as well as a darkening in color. The time of heating varies with the particular composition used. After a certain time of heating at a given temperature the viscosity increases very rapidly and the resin tends to gel. In general the heating is carried to a stage short of the gelation point. The acid number decreases on heating and therefore the time and temperature employed are those found or calculated to produce the viscosity and acid number desired for the particular resin. It is frequently desirable to add some hydrocarbon solvent to the finished resin while it is still in the molten state, particularly if the products are to be used as varnishes, enamels, etc., to obviate handling of the resin when it has cooled to ordinary temperatures. For this purpose, we have used aromatic hydrocarbons such as toluene, xylene, mesitylene, and mixtures thereof, aliphatic hydrocarbon mixtures such as mineral spirits, or mixtures of these, the resins containing a large amount of oil usually requiring little or no aromatic solvents.

For economic reasons, we prefer to use glycerol as the polyhydric alcohol and phthalic anhydride as the polybasic acid. Drying oil acids, e. g. linseed oil acids and/or rosin are excellent modifying agents in addition to the amine. Secondary amines seem somewhat preferable to the primary amines, and primary amines are more reactive than tertiary amines. As a rule, we use quantities of the acidic ingredients (polybasic acid, drying oil acids, natural resinic acids, etc.) which do not deviate too far from that which is equivalent chemically to the polyhydric alcohol, and in addition we use one equivalent of the polybasic acid for each equivalent of the primary amine and each half-equivalent of the secondary amine. The tertiary amine may be disregarded stoichiometrically. The total weight of all the ingredients, including the amine, we term the "resin charge". Of this resin charge, the amine may constitute a high or low percentage as desired, larger quantities of the amine in most cases tending to form softer and darker resins.

Convenient methods of adding the amine are as follows: if a gas, e. g., dimethyl amine, the anhydrous gas is directly vaporized into the reaction vessel; if a liquid, e. g., monoethyl anilin, it is added drop-wise or in a stream, or the liquid may be vaporized and vapors passed into the reaction mass; if a solid melting below 100° C., e. g., diphenyl amine, it is added drop-wise from a steam-heated separatory funnel or other reservoir; if a high-melting solid, it is fused simultaneously, added in small portions at various time intervals, or introduced continuously.

The following examples are illustrative methods that may be used in carrying out the invention with various amines:

Example I

Seventy-four and four-tenths parts by weight glycerol, 133.6 parts by weight linseed oil acids, 62.2 parts by weight China-wood oil acids, and 196.5 parts by weight phthalic anhydride are heated in the apparatus described, provided also with a dropping funnel, to 190° C. until a drop placed on a glass plate is clear and homogeneous when cold. Thirty to forty-five minutes are usually required. Thirty-six and five-tenths parts by weight mono n-butyl amine (B. P. 75–77°) is then added drop-wise, this addition also requiring 30–45 minutes. The temperature is then held at 200° C. for about 4 hours. The resin may be cut while hot with xylol or some aromatic hydrocarbon mixture. The acid number of the resin content of this solution is about 30.

Example II

Eighty parts by weight glycerol, 455.3 parts by weight linseed oil acids, 227.5 parts by weight China-wood oil acids, 137.7 parts by weight wood rosin, and 37.7 parts by weight phthalic anhydride are brought up to a temperature of 200° C. over a period of one hour. Sixty-one and seven-tenths parts by weight monoethyl anilin (B. P. 203–204° C.) is added drop-wise over a period of about 40 min. The resin is then heated and stirred at 200° C. for an additional 8–9 hours. The acid number is about 33.

We have observed that many of the aromatic amines, such as the substituted anilins and toluidines, impart various tints to polyhydric alcohol-polybasic acid resins, particularly in the absence of other modifying agents. For example, a resin prepared from phthalic anhydride, glycerol, and monoethyl anilin had a greenish-brown color; another prepared from phthalic anhydride, glycerol, ethylene glycol, and dimethyl anilin was tinted bluish-green. From such resins, molded articles of various colors can be made.

Example III

Sixty-nine and six-tenths parts by weight glycerol, 156.9 parts by weight linseed oil acids, 62.7 parts by weight China-wood oil acids, and 157.9 parts by weight phthalic anhydride are brought up to a temperature of 190° C. over a period of one hour. Fifty-two and nine-tenths parts by weight piperidine is then added drop-wise over a period of one hour. Water vapor, in which there is no odor of piperidine, is evolved. The resin is held at 190–200° C. for 7–8 hours after the addition of the piperidine. The acid number is about 30.

While it is preferred, as indicated by the above examples, to add the amine during the synthesis of the resin, the amine and other ingredients can be initially mixed and reacted together in accordance with the following example:

Example IV

One hundred seventy-one and one-tenth parts by weight glycerol, 558.0 parts by weight linseed oil acids, 270.9 parts by weight phthalic anhydride and 50.0 parts by weight carbazole are fused simultaneously at 200–210° C. for 11–12 hours. The acid number is 10–12. This may be dissolved in a mixture of equal parts of aromatic solvent naphtha and mineral spirits.

This method of simultaneous fusion of all ingredients (except with gaseous amines) may be carried out best under a reflux condenser with subsequent removal of the condenser. This procedure is especially applicable when using amines which are low boiling liquids.

Gaseous amines, as the dimethyl amine in the following example, may be incorporated into the resin by passing the amine obtained either from a reservoir of the gas or by vaporization from aqueous or other solution, into the fused mass of the resin ingredients.

Example V

Fifty-one and three-tenths parts by weight glycerol, 167.4 parts by weight linseed oil acids, and 81.3 parts by weight phthalic anhydride are fused at 200° C. in the usual apparatus, and held at this point until clear. Fifty parts by weight anhydrous dimethyl amine (conveniently obtained from 167 parts by weight 30% aqueous solution by dropping the latter upon quicklime) is vaporized directly into the reaction vessel, the delivery tube extending beneath the surface of the liquid. The addition of the amine should require about one hour, after which the temperature is raised to 225° C. and held at this point for 4–5 hours, the resin becoming, meanwhile, dark and viscous. The acid number is about 4–5. Dark, hard, and flexible films of high gloss are formed by applying a solution of the resin in a solvent such as mineral thinner over steel or over priming coats of asphaltic composition and baking at 230° C.

Another method of making our new resins consists in reacting the resin-forming ingredients according to the following example in which the polyhydric alcohol, polybasic acid, and modifying agent are heated in an inert solvent, provision being had for removal of the water of reaction, the amine being added to the reaction mixture while resinification is taking place. By an inert solvent is meant a solvent which does not react with any of the resin components or with the resin under the conditions of the resinification. Such solvents are known commercially as Hi-flash naphtha, other aromatic hydrocarbon mixtures, xylol, toluol, cyclohexanone, chlorobenzene, dichloroethyl ether, etc.

Example VI

Three hundred thirteen and seven-tenths parts by weight linseed oil acids, 125.5 parts by weight China-wood oil acids, 315.4 parts by weight phthalic anhydride, 154.4 parts by weight glycerol, and 335 parts by weight Hi-flash naphtha are heated to boiling in a vessel provided with a downward condenser, to which is attached a device for separating the mixture of naphtha and water of reaction and returning the former to the reaction vessel. The heating and distillation are continued until the solution becomes clear. Ninety-one parts by weight of monoethyl anilin is then added drop-wise over a period of about two hours. Heating and stirring are continued for seven hours after the addition of the monoethyl anilin. The final acid number of the resin content of the solution is 38.2.

Previously prepared partially or totally substituted amides may be used as resin ingredients as in the following example wherein the amine is first heated with the polybasic acid. The resin may also be prepared by combining (by fusion or in solution) the preformed soluble ester with the preformed amide, then heating to resinification.

Example VII

Seventy and six-tenths parts by weight phthalic anhydride and 61.6 parts by weight di-n-butyl amine (equimolar proportions) are heated in an open vessel to 100° C. for 15 minutes. To this product are added 309.8 parts by weight linseed oil acids, 123.9 parts by weight China-wood oil acids, 256.6 parts by weight phthalic anhydride, and 177.5 parts by weight glycerol. This mixture is heated at 200–205° C. for 5 hours. The final acid number is 10.5.

The foregoing examples are illustrative of the types of amine modified resins recommended in the field of protective coatings. In each case a fatty oil and/or a natural gum has been used as an additional modifier. We have also obtained excellent results with the amine, polyhydric alcohol, and polybasic acid alone, i. e., without oils and gums, particularly when the products are to be used for molding, or for the impregnation and toughening of paper, cloth and various porous materials. The following example also illustrates another of the many ways in which the ingredients may be combined, also the use of other polyhydric alcohols in addition to glycerol. It is related to Example VII in that the amine is heated first with a portion of the polybasic acid.

Example VIII

One hundred seventy-six and nine-tenths parts by weight of phthalic anhydride and 154.2 parts by weight of di-n-butyl amine are heated with stirring to 100–110° C. and this temperature maintained for 15 minutes. To the clear amber liquid are added 935.2 parts by weight of phthalic anhydride and 733.7 parts by weight of diethylene glycol. A clear solution is obtained at 140° C. The mass is transferred to a flask fitted with a stirrer and air-cooled reflux condenser. After six hours at 145° C. the acid number is 174.6. The temperature is then raised to 200–205° C. and held for 10 hours, after which time an acid number of 59.8 is reached. The mixture is carried to 225° C. and after four hours at this point, 95 parts by weight of diethylene glycol is added and the resulting mixture held at 225° C. for an additional five hours. The final acid number is 33.9. The product is a light brown semi-solid resin.

Although we prefer primary and secondary amines in preparing the amine modified polyhydric alcohol-polybasic acid resins, it is possible to use tertiary amines, as in the following example. In such cases, we usually have found it satisfactory simply to add the tertiary amine as excess material to chemically equivalent proportions of the remaining ingredients.

Example IX

Seventeen and nine-tenths parts by weight of glycerol, 11.8 parts by weight of ethylene glycol, and 70.3 parts by weight of phthalic anhydride are heated to 190° C. Fifteen parts by weight of dimethyl anilin is added continuously over a period of about thirty minutes. During this addition, the resin changes from a pale straw color to a light blue, which gradually darkens. After the addition of the amine, heating is continued at 210–215° C. for 5 hours, or to an acid number of 70. The final product is a clear, greenish-brown resin, soluble in alcohol-hydrocarbon mixtures, acetone, butyl acetate, and insoluble in water.

By substituting 15 parts by weight of tributyl amine for the dimethyl anilin in the above example (the proportions of the other ingredients also remaining the same) and following the same heat and time schedules, a dark brown resin of acid number 95 is obtained which is soluble in alcohol-hydrocarbon mixtures, ketones, and esters, and insoluble in water. This latter property was tested by stirring the powdered resin with water, filtering and acidifying. No precipitate was obtained and the solution deposited no organic material on evaporation to dryness.

It will be apparent from the foregoing examples that the resin ingredients can be reacted together in various ways to produce the new resinous products. It is to be understood, therefore, that for the purposes of the present invention, these resinous products are defined, regardless of the manner or order in which the ingredients are reacted, as the reaction product of a polyhydric alcohol, a polybasic acid, and an organic amine, with or without the addition of the usual modifying agents (other than the amine).

The present invention is applicable to amines generally. The following additional amines are mentioned as indicating the large number of amino compounds from which selection may be made: Aliphatic amines: monomethyl amine, monoethyl amine, mono n-propyl amine, diethyl amine, ethylene diamine, tributyl amine, and mixtures of primary, secondary, and tertiary amines; Mixed aliphatic and aromatic amines: monomethyl anilin, monobutyl anilin, dimethyl anilin, and similarly substituted homologs of anilin, e. g., monoethyl p-toluidine; Aromatic amines; diphenyl amine, naphthyl amines, triphenyl amine, toluidines, amino phenols, amino anthraquinones, m-phenylene diamine, anilin, and benzidine; Homocyclic (hydro aromatic) amines: methyl cyclohexyl amine and cyclohexyl amine; Heterocyclic amines: pyrrol, pyrrolidine, piperidine, quinoline, and hydrogenated picolines, collidines, lutidines, quinolines, acridines, and anthrapyridines. In general, organic compounds, basic in nature or chemical action, having an amino or imino hydrogen atom, are preferable. Some such compounds which are not basic, or very weakly so, such as isatin, phthalimide, and succinimide, may also be used; these, however, are not particularly desirable as the percentage which may be used to form a clear resin is limited.

The resin ingredients other than the amine may be any of those usually used in the preparation of polyhydric alcohol-polybasic acid resin. Thus, instead of phthalic anhydride, we may use such polybasic acids as adipic, succinic, maleic, trimesic, dilactylic, malic, tricarballylic, citric, diphenic, naphthalic, chlorophthalic, tartaric acids. The glycerol, ethylene glycol, and diethylene glycol previously mentioned may be replaced with other polyhydric alcohols such as propylene glycol and higher homologs of ethylene glycol, diethylene glycol and other poly-glycols, triethanolamine, pentaerythritol, sorbitol, etc. As modifying agents other than the amine, we prefer to use fatty oil acids such as linseed oil acids, China-wood oil acids, or cottonseed oil fatty acids. Instead of the fatty acids of the oils, the vegetable oils themselves, such as castor, linseed, cottonseed or coconut oils, may be used. It is desirable, however, when using the oils, first to convert them into mono or diglycerides (or the equivalent esters of the other polyhydric alcohols), or a mixture thereof, by heating the oil with the polyhydric alcohol. The linseed oil mono and diglycerides, and China-wood oil mono and diglycerides are especially suitable. Modifications in the properties of the resins may also be obtained by the inclusion of monohydric alcohols and monobasic acids. Other usual ingredients such as natural resins may be used when desired. These are what we wish to call "modifying agents". Catalysts such as sulfuric and phosphoric acids may be used. A part or all of the process may be carried out under pressure, such as by the use of completely closed vessels.

The products of the present invention are especially useful in the manufacture of various types of coating compositions, such as varnishes, lacquers, and baking enamels which are suitable for application over plain steel or over asphaltic priming compositions.

*Example X*

A baking enamel may be made from an amine-modified resin and asphalt as follows:

Eighteen parts by weight of the resin obtained in Example VII and 18 parts by weight of asphalt are dissolved in 54 parts by weight of Hi-flash naphtha and the mixture ground in a ball mill. The enamel is flowed on steel, air-dried for 40 minutes, and then baked on a heat schedule of 12 minutes up to 235° C. and 20 minutes at 235° C. This enamel after baking is a deep rich black which is very lustrous. The steel can be bent into various shapes and designs and the film does not chip or flake off.

*Example XI*

A pigmented baking enamel may be made by grinding 31.6 parts by weight of the resin obtained in Example VII, 4.4 parts by weight carbon black, and 54 parts by weight of Hi-flash naphtha in a ball mill. This enamel when flowed on steel and baked as in Example X gives a very hard film which adheres well to the metal. Instead of carbon black, we may use white or colored pigments such as chrome orange or green, ultramarine blue, titanium oxide, para toner red, etc.

If the resins produced in accordance with the present invention are baked as unpigmented clears over asphaltic priming compositions, films of an unusual gloss and flexibility are obtained. This use is particularly advantageous where a dead black color is not necessary, such as for finishings of refrigerators, typewriters, decorative metal fittings, etc.

Our products also find use as constituents of lacquers and pyroxylin enamels, in accordance with the following example.

*Example XII*

| | Parts by weight |
|---|---|
| Resin of Example II | 12 |
| Nitrocellulose (0.5 sec.) | 6 |
| Butyl acetate | 17 |
| Ethyl lactate | 3 |
| Ethyl acetate | 10 |
| Butyl alcohol | 10 |
| Ethyl alcohol | 15 |
| Toluol | 20 |
| Aliphatic hydrocarbon mixture | 7 |

The above lacquer combines exceptional durability with great toughness and adhesion and a high gloss.

A baked coating may be prepared by mixing the resin components, heating to effect an initial condensation, flowing the initial condensation product alone or in solution on the surface to be enameled, heating to effect resinification, and prolonging the heating to such an extent that the resin reaches the insoluble, infusible stage. Such a process is applicable especially to the coating of metal. This does not represent a preferred embodiment of our invention, however.

*Example XIII*

A varnish clear may be prepared as follows: To 67.8 parts by weight of the resin solution obtained in Example VI is added 32.2 parts by weight Hi-flash naphtha. To this solution is added 0.1% cobalt drier (basis of oil). Films of this varnish, which hardens on exposure to the air, form a smooth and lustrous protective finish.

The new resins are useful in preparing impregnating compositions as indicated by the following example:

*Example XIV*

Sixty parts by weight of the resin obtained in Example VIII is dissolved in 240 parts by weight of acetone. Sheets of porous paper are saturated with this solution and dried over night. The impregnated paper is very tough and difficult to tear.

Our new resinous compositions are also useful as binding agents for inert fillers to make molding compositions, and for the preparation of insulating varnishes. They are insoluble in water and after baking are in general insoluble in solvents such as aliphatic hydrocarbons.

These resins may be used in coating or impregnating compositions with or without the usual film forming materials such as drying oils (linseed, China wood, etc.) natural resins (kauri, damar, copal, pontianac, Manila, etc.) synthetic resins (phenol-formaldehyde, urea-formaldehyde, vinyl, etc.) cellulose derivatives (cellulose nitrate, acetate, butyrate, nitroacetate, crotonate, ethyl cellulose, benzyl cellulose, crotyl cellulose, etc.) and bitumens (such as asphalt). It is of course understood that suitable solvents, plasticizers, and blending agents are preferably used to obtain compatible films.

As many apparently widely different embodiments of this invention may be made without departing from the spirit and scope thereof, it is to be understood that we do not limit ourselves to the specific embodiments thereof except as defined in the following claims:

We claim:

1. A process for manufacturing resinous products which comprises mixing polyhydric alcohol, polybasic acid, fatty oil acid and an aliphatic organic amine and then reacting in the presence of an inert solvent until a resin soluble in Hi-flash naphtha is produced and which is capable of yielding smooth films from solutions in organic solvents.

2. A process which comprises heating a mixture of polyhydric alcohol, polybasic acid and fatty oil acids at a temperature of 180°–200° C., adding to said mixture a substantial quantity of an aliphatic amine in small amounts over a period of 30 to 45 minutes during said heating, and continuing the heating at 220°–225° C. for 4 to 10 hours until a resin soluble in organic solvent is produced.

MERLIN MARTIN BRUBAKER.
RAYMOND EINNON THOMAS.